United States Patent
Webb et al.

(10) Patent No.: US 8,671,918 B2
(45) Date of Patent: *Mar. 18, 2014

(54) DEVICES, SYSTEMS, AND METHODS FOR CONTROLLING FUEL STATES FOR INTERNAL COMBUSTION ENGINES

(75) Inventors: John David Webb, Milton-Freewater, OR (US); Robert Ralph Webb, Jr., Milton-Freewater, OR (US); Michael Eugene Clason, Ontario, OR (US); Joe Humbert, Milton-Freewater, OR (US)

(73) Assignee: Nox Free Solutions LLC, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,339

(22) Filed: Jun. 19, 2012

(65) Prior Publication Data

US 2012/0255527 A1 Oct. 11, 2012

Related U.S. Application Data

(63) Continuation of application No. 12/505,004, filed on Jul. 17, 2009, now Pat. No. 8,220,441.

(60) Provisional application No. 61/081,614, filed on Jul. 17, 2008.

(51) Int. Cl.
*F02M 31/00* (2006.01)

(52) U.S. Cl.
USPC .......................................... 123/557

(58) Field of Classification Search
USPC ................................. 123/543–558
See application file for complete search history.

(56) References Cited

U.S. PATENT DOCUMENTS

| | | | | |
|---|---|---|---|---|
| 1,980,496 | A | * | 11/1934 | Musselwhite ................. 261/144 |
| 3,324,891 | A | | 6/1967 | Rhoades |
| 3,911,881 | A | | 10/1975 | Lee, Jr. |
| 4,036,182 | A | * | 7/1977 | Gandy .............................. 123/3 |

(Continued)

FOREIGN PATENT DOCUMENTS

FR 2544800 10/1984

OTHER PUBLICATIONS

*Changes in Gasoline III—The Auto Technician's Gasoline Quality Guide* [online], Jan. 1996 [retrieved on Jan. 20, 2010]. Retrieved from the Internet: <URL: http://www.ethanolrfa.org/objects/pdf/AboutRFA/Gasoline.pdf>.

(Continued)

*Primary Examiner* — M. McMahon
(74) *Attorney, Agent, or Firm* — Miles & Stockbridge PC; Mark A. Catan

(57) ABSTRACT

A fuel state control unit for use with internal combustion engines can include a primary heating chamber, a secondary heating chamber, and an expansion chamber. The primary heating chamber has a fuel conduit through which fuel is conveyed. A heater in the primary heating chamber transmits heat to the conveyed fuel in the primary heating chamber. The heater is controlled to maintain a predetermined temperature of the fuel. The heated fuel from the conduit is conveyed into a secondary heating chamber. A pressure plate separates the secondary heating chamber from the expansion chamber. The ports of the pressure plate can regulate the flow of the fuel into the expansion chamber. The heated fuel in the expansion chamber can then be conveyed to an engine so as to increase engine efficiency and reduce the amount of pollutant gases in the engine exhaust.

17 Claims, 7 Drawing Sheets

(56) References Cited

U.S. PATENT DOCUMENTS

| | | | |
|---|---|---|---|
| 4,047,512 A * | 9/1977 | Hough et al. | 123/557 |
| 4,091,782 A | 5/1978 | Dunnam | |
| 4,106,457 A * | 8/1978 | Totten et al. | 123/557 |
| 4,197,819 A | 4/1980 | Mahoney et al. | |
| 4,267,976 A * | 5/1981 | Chatwin | 239/102.2 |
| 4,312,317 A | 1/1982 | Jewett et al. | |
| 4,338,891 A * | 7/1982 | Blitz | 123/41.31 |
| 4,364,365 A * | 12/1982 | Gendron | 123/557 |
| 4,367,717 A | 1/1983 | Ray | |
| 4,406,270 A | 9/1983 | Simonson, Sr. | |
| 4,422,429 A | 12/1983 | Reed | |
| 4,424,788 A | 1/1984 | Bookout | |
| 4,434,774 A | 3/1984 | Horiuchi | |
| 4,454,841 A | 6/1984 | Reinhard et al. | |
| 4,681,081 A | 7/1987 | LaPan | |
| 4,722,314 A | 2/1988 | Martinson | |
| 5,205,250 A | 4/1993 | Easterly et al. | |
| 5,257,609 A | 11/1993 | Reed et al. | |
| 5,443,053 A * | 8/1995 | Johnson | 123/557 |
| 5,611,392 A * | 3/1997 | Malecek et al. | 165/47 |
| 5,746,188 A * | 5/1998 | Cooke | 123/549 |
| 6,746,002 B2 | 6/2004 | Jones | |
| 8,220,441 B2 * | 7/2012 | Webb et al. | 123/557 |
| 2004/0159963 A1 | 8/2004 | Jones | |
| 2004/0187851 A1 | 9/2004 | Sexton et al. | |
| 2007/0056569 A1 | 3/2007 | Kleinberger | |

OTHER PUBLICATIONS

*Changes in Gasoline III—Year 2000 Supplemental Update* [online], [retrieved on Jan. 20, 2010]. Retrieved from the Internet: <URL: http://www.ethanolrfa.org/objects/pdf/2KSupplement.pdf>.

*Changes in Gasoline IV—The Auto Technician's Guide to Spark Ignition Engine Fuel Quality* [online], Jun. 2009 [retrieved on Jan. 20, 2010]. Retrieved from the Intener: <URL: http://www.ethanolrfa.org/resource/technicians/documents/ChangesinGasolineManualIV-UpdatedLogo.pdf>.

* cited by examiner

DEVICES, SYSTEMS, AND METHODS FOR CONTROLLING FUEL STATES FOR INTERNAL COMBUSTION ENGINES

CROSS-REFERENCE TO RELATED APPLICATIONS

The present application is a continuation of U.S. application Ser. No. 12/505,004, filed Jul. 17, 2009, which claims the benefit of U.S. Provisional Application No. 61/081,614, filed Jul. 17, 2008, both of which are hereby incorporated by reference herein in their entireties.

FIELD

The present application relates generally to components for use with internal combustion engines and, more particularly, to devices, systems, and methods for controlling fuel states for internal combustion engines.

SUMMARY

In embodiments of the present disclosure, a fuel state control unit for a selected internal combustion engine may include a flow acceleration device that produces a flow acceleration sufficient to produce cavitation. A temperature regulation component may be provided to ensure fuel temperatures of 120° F. or higher.

According to embodiments of the disclosed subject matter, a fuel state control unit has a first chamber, a second chamber, and a third chamber. The first chamber can have a first interior volume, a first inlet, and a first outlet. A heat transfer conduit can be disposed within the first interior volume and can connect the first inlet with the first outlet such that fuel can be conveyed within the heat transfer conduit. The first interior volume can be fluidically isolated from fuel conveyed in the heat transfer conduit.

The second chamber can have a second interior volume. The second chamber can be disposed adjacent to the first chamber and can be separated therefrom by an insulating plate. The insulating plate can have a flowpath extending therethrough such that fuel from the first outlet can flow through the insulating plate flowpath into the second interior volume. The insulating plate can be a ceramic, a polymer, or a polymer composite material;

The third chamber can have a third interior volume. The third chamber can be disposed adjacent to the second chamber and can be separated therefrom by a pressure plate. The pressure plate can have two ports extending therethrough such that fuel in the second interior volume can flow through the ports into the third interior volume. The ports can have diameters that provide, at a fuel flow rate of at least 1 gallon per hour, a cavitation number below 1000. The ports can have diameters not greater than 0.5-inch (½"). The diameters of the ports in the pressure plate can further be selected such that, at moderate load operating conditions of the selected internal combustion engine, the change in the pressure across the ports is no less than negative 5% of the pressure in the second chamber.

A pickup tube can be disposed in the third interior volume and can convey fuel in the third interior volume to a fuel line for use by the selected internal combustion engine.

A heating element can be disposed in the first interior volume of the fuel state control unit and can heat fuel conveyed in the heat transfer conduit. A thermostat can regulate an output of the heating element to maintain a temperature of fuel in the heat transfer conduit in a predefined range between 90° F. and 180° F. The thermostat can be in thermal communication with either of the first and second interior volumes.

A heat transfer fluid can fill at least a portion of the first interior volume. For example, the heat transfer fluid can be automotive anti-freeze. The thermostat can be in thermal communication with the first interior volume and can measure a temperature of the heat transfer fluid.

In embodiments, a fuel state control unit for an internal combustion engine can include a multi-chamber module having at least a first chamber, a second chamber, and a third chamber serially arranged. The multi-chamber module can have a fuel inlet and a fuel outlet. The fuel inlet can connect to a fuel supply, and the fuel outlet can connect to a fuel delivery unit for the internal combustion engine.

The fuel inlet can be in fluid communication with a conduit extending through the first chamber. The conduit may be a helical conduit. The second chamber can be in fluid communication with an outlet of the conduit. The third chamber can be in fluid communication with the second chamber through at least one port extending between the second chamber and the third chamber. The fuel outlet of the multi-chamber module can be connected to a fuel rail of a fuel injection system or a carburetor of the internal combustion engine.

The fuel state control unit can further include a heating module that heats fuel flowing through the conduit to a temperature between 90° F. and 180° F. The heating module can include a glow plug or cal rod in the first chamber and a thermostat in thermal communication with the first chamber. The glow plug or cal rod can heat a heat transfer fluid in the first chamber. The thermostat can measure a temperature of the heat transfer fluid and control operation of the glow plug or cal rod responsively to the measured temperature.

The multi-chamber module of the fuel state control unit may further include a heat transfer fluid inlet and a heat transfer fluid outlet. The heat transfer fluid inlet and outlet can connect to respective lines of a heat transfer fluid supply. The heating module may include a vacuum valve and a vacuum thermostat. The vacuum valve can be coupled to one of the heat transfer fluid inlet and the heat transfer fluid outlet. The vacuum valve may control flow of fluid therethrough. The vacuum thermostat can be in thermal communication with the second chamber and can control an open state of the vacuum valve responsively to temperature of fuel in the second chamber. The heat transfer fluid can be engine coolant or engine oil that has been heated by the internal combustion engine.

In embodiments, an engine system can include an internal combustion engine, a fuel delivery unit, and a fuel state control unit. The fuel delivery unit can mix fuel from a fuel supply with air and can provide the mixture to the internal combustion engine for use thereby. The fuel state control unit can be operatively coupled between the fuel supply and the fuel delivery unit in a fuel line.

The fuel state control unit can include a multi-chamber module having at least a first chamber, a second chamber, and a third chamber serially arranged. The multi-chamber module can have a fuel inlet and a fuel outlet. The fuel inlet can be connected to the fuel supply. The fuel outlet can be connected to the fuel delivery unit.

The fuel inlet can be in fluid communication with a conduit extending through the first chamber. The second chamber can be in fluid communication with an outlet of said conduit. The third chamber can be in fluid communication with the second chamber through at least one port extending between the second chamber and the third chamber.

A heating module can heat fuel flowing through the conduit to a temperature between 90° F. and 180° F. Exhaust emissions of carbon monoxide, hydrocarbons, and nitrogen oxides of the internal combustion engine may be reduced compared with exhaust emissions of carbon monoxide, hydrocarbons, and nitrogen oxides of the internal combustion engine without the fuel state control unit operatively coupled in the fuel line.

Objects, advantages, and features of the present disclosure will become apparent from the following detailed description when considered in conjunction with the accompanying drawings.

BRIEF DESCRIPTION OF THE DRAWINGS

Where appropriate, like reference numbers have been used to indicate like elements in the figures. Unless otherwise noted, the figures have not been drawn to scale.

DETAILED DESCRIPTION

Figure 1A:
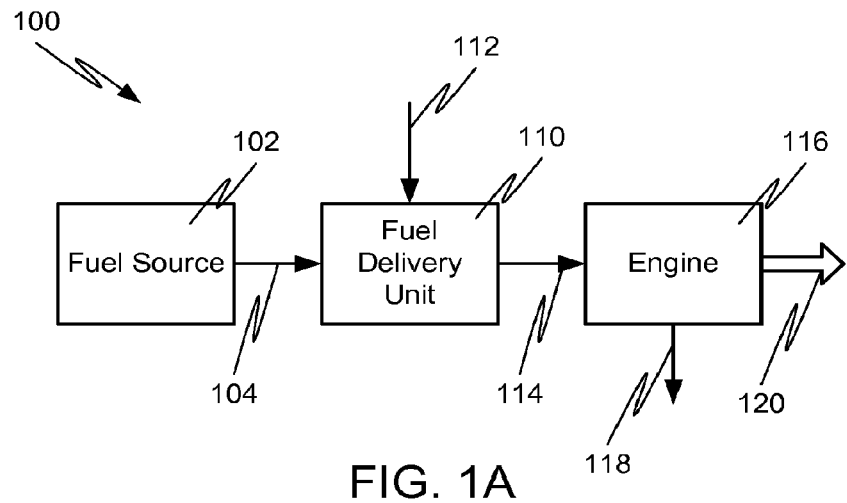
FIG. 1A is a simplified schematic showing the arrangement of components of an engine-based system.

Referring to FIG. 1A, an engine system 100 includes an internal combustion engine 116. Fuel is supplied from a fuel source 102 to engine 116 by way of a fuel delivery unit 110. For example, the fuel source 102 can include a fuel tank, which holds an amount of the fuel, and a fuel pump, which delivers the fuel from the tank under pressure. Fuel line 104 connects the fuel source 102 to the fuel delivery unit 110, which then combines the fuel with air from air input 112 for use by the engine 116. For example, the fuel delivery unit can be a carburetor or a fuel injection system. Air-fuel delivery line 114 connects the engine 116 to the fuel delivery unit 110, by which connection the air-fuel mixture from the fuel delivery unit 110 can be provided to the various combustion chambers of the engine 116. Note that the air-fuel delivery line 114 is only illustrative of the delivery of the air-fuel mixture to the engine and need not be embodied by a single physical connection between the fuel delivery unit 110 and the engine 116. The air-fuel mixture in the combustion chambers are compressed and ignited to produce useful work 120 and exhaust gases 118.

The internal combustion engine 116 can be mounted in an automotive vehicle, such as a car or truck, so as to provide power to wheels thereof. Alternatively, the engine 116 can be mounted in a fixed location. For example, the engine 116 can be used in an electric generator. The internal combustion engine 116 can be a gas engine or a diesel engine. Accordingly, the fuel supplied by the fuel source 102 can be, but is not limited to, gasoline or diesel fuel.

The exhaust gas 118 generally includes a mixture of various by-products of the combustion process. This mixture can include pollutant gases such as carbon dioxide ($CO_2$), carbon monoxide (CO), oxygen ($O_2$), nitrogen oxides ($NO_x$) and volatile hydrocarbons (HC). Inefficient engine operation can result in an increase of these pollutant gas emissions in the engine exhaust. By controlling the state (e.g., phase, temperature, and pressure) of the fuel supplied to the engine 116, more complete combustion of the fuel may be possible, thereby resulting in decreased pollutant gas emissions and improving fuel efficiency (e.g., miles per gallon) and/or engine power (i.e., horsepower).

Figure 1B:
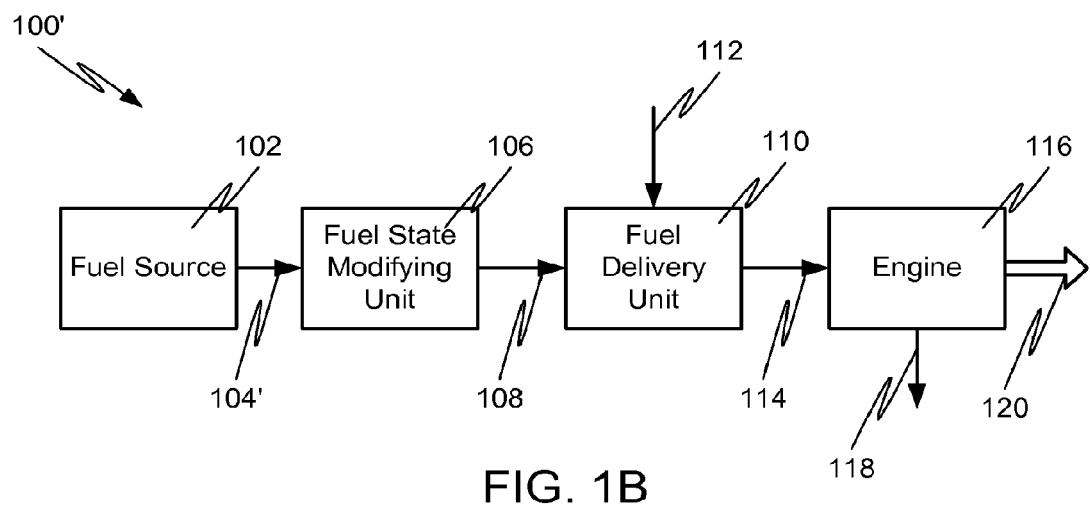
FIG. 1B is a simplified schematic showing the arrangement of components of an engine-based system with a fuel state control unit, according to embodiments of the present disclosure

With reference to FIG. 1 B, an engine system 100' can include a fuel state control unit 106 for manipulating the state of the fuel supplied to engine 116. The fuel state control unit 106 can be placed between the fuel source 102 and the fuel delivery unit 110 with fuel line 104' providing the connection between the fuel source 102 and the fuel delivery unit 110. Within the fuel state control unit 106, the fuel can be heated and/or expanded to a desired temperature and pressure so as to reduce engine emissions and/or improve engine efficiency. A second fuel line 108 connects the output of the fuel state control unit 106 to the fuel delivery unit 110 for providing modified fuel thereto. Similar to FIG. 1A, the modified fuel can then be combined with air 112 and supplied to engine 116 for producing power 120 therefrom.

Figure 2:
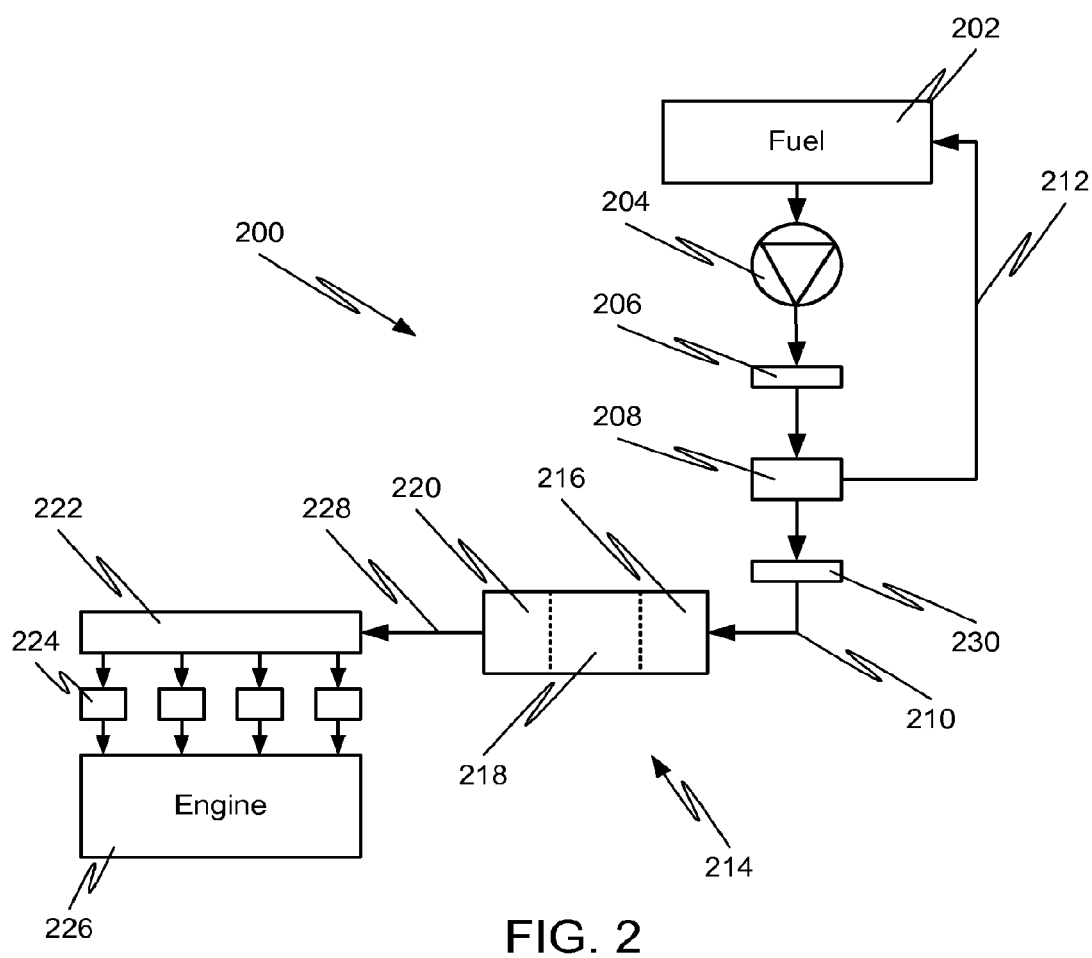
FIG. 2 is a more detailed schematic showing the arrangement of components of an engine-based system with a fuel state control unit, according to embodiments of the present disclosure.

Referring now to FIG. 2, a detailed schematic is shown of an engine system 200 of a fuel-injected automobile engine. Fuel tank 202 holds a supply of gasoline for use by engine 226 in powering an automobile. A fuel pump 204 is connected to the fuel tank 202 for delivering gasoline in a controlled manner. A fuel filter 206 can be provided in-line to remove particulate and other contaminants that may be in the gasoline from the fuel tank 202. On some cars, the fuel rail 222 has a return line which supplies fuel back to the fuel tank 202. Such a configuration can include an optional pressure regulator valve 208 between the fuel tank 202 and the fuel rail 222 that would return fuel to the fuel tank 202 via return line 212. The pressure regulator valve 208 can maintain the pressure at the fuel rail so that injectors will operate as needed. The optional regulator return valve 208 can be provided after the filter 206 and upstream of the fuel state control unit 214.

The gasoline can be provided via fuel line 210 to the fuel state control unit 214, where it undergoes controlled heating and/or expansion. The fuel state control unit 214 can include three separate chambers, which can be connected together as a unitary device or formed as a single unit. Alternatively, the three separate chambers may be embodied as separate devices. Additional chambers can be provided before, after, or interspersed between the three separate chambers according to one or more contemplated embodiments. The three separate chambers of the fuel state control unit 214 can include a primary heating chamber 216, a secondary heating chamber 218, and an expansion chamber 220. The fuel state control unit 214 can be mounted horizontally (i.e., with chambers 216-220 at the same height), vertically (i.e., with chambers 216-220 at different heights), or at some other angle. In a preferred configuration, the fuel state control unit 214 is mounted horizontally in the engine compartment near the engine 226. After the expansion chamber 220, the heated gasoline can be conveyed via fuel line 228 to a fuel rail 222, which in turn can supply the pressurized and/or heated fuel to fuel injectors 224 associated with combustion chambers in engine 226.

The fuel state control unit 214 may result in fuel pressures greater than that provide by the fuel pump 204. A one-way valve 230, such as a check valve, may be incorporated into the fuel line 210 between the fuel pump 204 and the fuel state control unit 214 to prevent pressure loss from the fuel state control unit 214. Other mechanisms for maintaining pressure in the fuel state control unit 214 and thus at the delivery unit (e.g., fuel rail 222) are also possible according to one or more contemplated embodiments.

Figure 3:
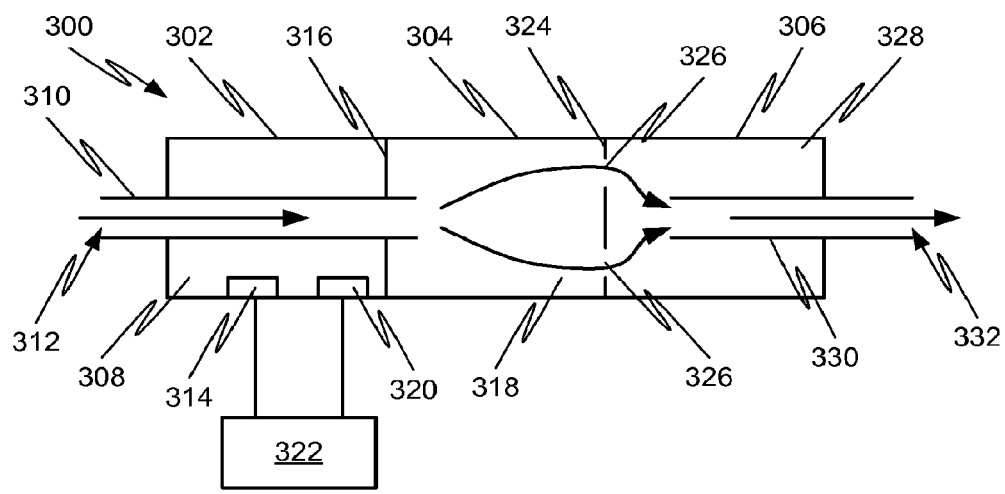
FIG. 3 is a simplified schematic of a fuel state control unit, according to embodiments of the present disclosure.

Referring to FIG. 3, a fuel state control unit 300 is shown in simplified schematic form. A primary heating chamber 302 can have a sealed interior space 308, through which a fuel conduit 310 can extend. The fuel conduit 310 may be sealed from the interior volume 308 such that fuel is conveyed from the inlet 312 thereof to the interior volume 318 of a secondary heating chamber 304. A heating element 314 can be provided within the primary heating chamber 302 and can heat the fuel flowing through conduit 310. The interior volume 308 of the primary heating chamber 302 can be filled with a heat transfer fluid to allow for improved heat transfer between the heating element 314 and the conduit 310. For example, the interior volume 308 may be filled with engine coolant, water, or automotive anti-freeze.

The secondary heating chamber 304 can be isolated from the primary heating chamber 302 by a partition 316. Partition 316 may be substantially insulating so as to minimize heat transfer between the two chambers. A temperature sensor 320 can be disposed within or in thermal communication with the interior volume 308 of the primary heating chamber 302. Thus, temperature sensor 320 can provide a measure of the temperature of the heat transfer fluid in the interior volume 308, which can be indicative of the temperature of the fuel flowing through the conduit 310. Alternatively, the temperature sensor 320 can be disposed within or in thermal communication with the interior volume 318 of the secondary heating chamber 304. Fuel that has passed through conduit 310 and heated therein is allowed to flow into the interior volume 318 of the secondary heating chamber 304. The temperature sensor 320 can thus detect the temperature of the fuel in the secondary heating chamber interior volume 318 and provide a signal indicative thereof. In yet another alternative, the temperature of the fuel flowing through conduit 310 can be directly sensed.

A control device 322 can be configured to receive the temperature signal from the temperature sensor 320 and control the heating element 314 responsively to the detected temperature. Other configurations and components to achieve regulated heating of the fuel in the primary heating chamber 302 are also possible according to one or more contemplated embodiments. For example, the heating element may be a vacuum valve that controls flow of a heating fluid and the temperature sensor may be a vacuum thermostat, in which case a separate control device 322 may not be necessary. Moreover, the temperature sensor does not necessarily need to generate an electrical signal to effect control of the heating element.

Fuel in the interior volume 318 of the secondary heating chamber 304 can flow to the interior volume 328 of the expansion chamber 306 by passing through pressure plate 324. Pressure plate 324 can have one or more openings 326, or ports, through which the fuel may pass to the expansion chamber interior volume 328. The ports can be of sufficient number and size to control the pressure and expansion of the fuel flowing therethrough. A pick-up tube 330 can communicate with the internal volume 328 of the expansion chamber 306. Fuel flowing through pressure plate 324 and into the interior volume 328 can thus be conveyed by the pick-up tube 330 to an outlet 332 for use by the engine.

In the primary heating chamber 302, the fuel may be heated in a controlled fashion and allowed to flow into a secondary heating chamber 304. The temperature of the fuel (by direct measurement of the fuel in the secondary heating chamber 304 or in conduit 310, or by indirect measurement of the heat transfer fluid temperature in the primary heating chamber) may be used to control the heating in the primary heating chamber 302. The fuel may be heated so as to have a temperature between 90° F. and 180° F., inclusive. A portion or the entire body of the fuel state control unit may be surrounded with appropriate insulation (not shown) to reduce heat transfer between interior volumes of the fuel state control unit and the external environment.

The fuel can also be heated and/or expanded in the fuel state control unit 300 such that a portion of the fuel undergoes a phase change from a liquid to a gas. For example, the fuel can be heated and expanded such that bubbles of vapor of the fuel are formed within the liquid fuel provided to the engine. In other words, the fuel state control unit can be configured to modify the fuel through heating and/or expansion so as to produce cavitation in the fuel exiting the fuel state control unit and/or entering a fuel delivery unit for supply to the engine.

The configuration of the pressure plate 324 and the expansion chamber 306 may serve to control the pressure of the heated fuel passing therethrough to within a desired range. For example, when connected to a carburetor, the pressure of the heated fuel at the outlet 332 may be such that the pressure of the heated fuel at the carburetor is between 5.5 and 6.5 psi. In another example, when connected to a fuel injection system, the configuration of the pressure plate 324 and the expansion chamber 306 may be such that the pressure of the heated fuel at the outlet 332 can be within, for example, 5 psi of that of the fuel rail if the fuel state control unit 300 was not present. For example, the pressure of the fuel from the fuel state control unit 300 can be controlled to have a value between 68 and 82 psi.

The configuration of the fuel state control unit 300 may also be such that a pressure drop occurs between the primary heating chamber 302 and the secondary heating chamber 304 and a pressure increase occurs between the secondary heating chamber 304 and the expansion chamber 306. The pressure of the primary heating chamber 302 and the pressure of the expansion chamber 306 can be substantially equal or within 5% of each other. The change in pressure across the ports in the pressure plate may be no less than negative five percent (−5%) of the pressure in the secondary heating chamber 304. Such a condition may be met under no load to moderate load operating conditions of the engine. For example, moderate load operating conditions of the engine may be defined as those load conditions present on the engine during normal acceleration of an automobile over level ground with 50% of passenger loading capacity.

Alternatively, the pressure of the expansion chamber 306 may greater than the pressure of the primary heating chamber or no more than 5% less than the pressure of the primary heating chamber 302. For example, the primary heating chamber 302 and the expansion chamber 306 may have a pressure of about 78 psi, the secondary heating chamber 304 may have a pressure of about 75 psi, and the fuel rail may have a pressure of about 80 psi.

Figure 4A:
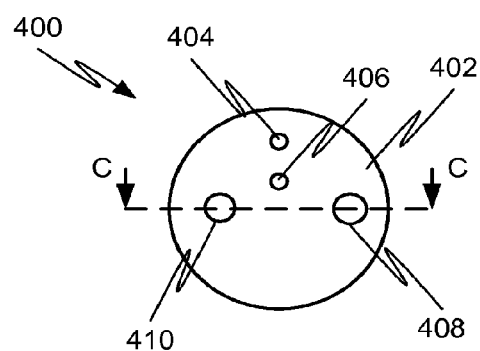
FIG. 4A is a front view of the exterior of a fuel state control unit, according to embodiments of the present disclosure.
Figure 4B:
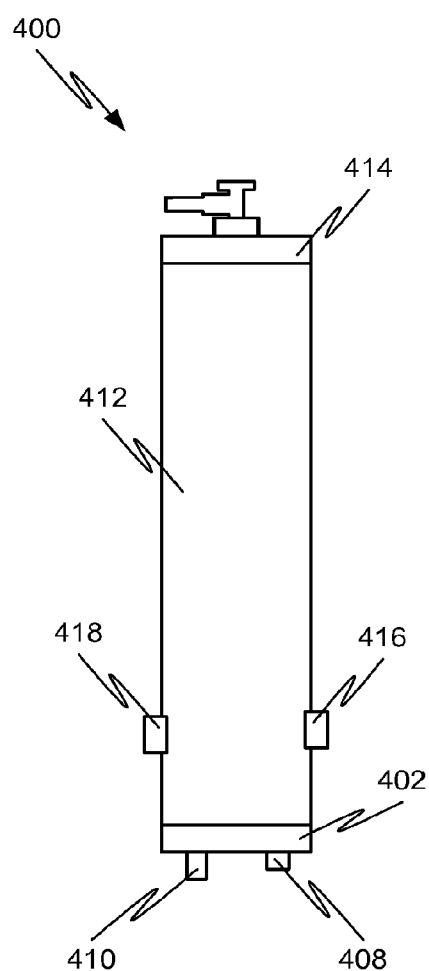
FIG. 4B is a side view of the exterior of a fuel state control unit, according to embodiments of the present disclosure.
Figure 4C:
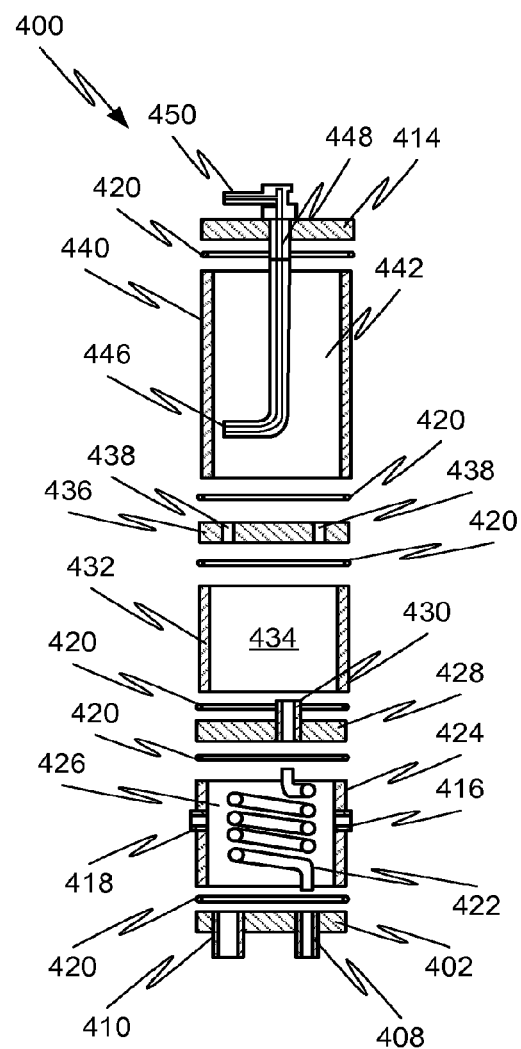
FIG. 4C is a cross-sectional view of the fuel state control unit along line C-C of FIG. 4A.

Referring now to FIGS. 4A-4C, an embodiment of a fuel state control unit 400 for use with an automobile engine is shown. The fuel state control unit 400 can have a diameter of 4.625-inches (4⅝") and an overall length of 20-inches (20") when assembled. Thus, the fuel state control unit 400 can be easily installed in the engine compartment of an automobile in close proximity to the other components of an automobile engine system.

The fuel state control unit 400 can include a base plate 402, which can be attached to the assembly 412 by any suitable means, such as bolting or welding. The base plate 402 can be made from any suitable material. For example, the base plate 402 can be a 0.5-inch (½") thick circular aluminum plate with a diameter of 4.625-inches (4⅝").

The base plate 402 can include a fuel inlet port 408, a thermostat 410, an optional heat transfer fluid "maximum fill level" viewing port 404, and an optional heat transfer fluid "minimum fill level" viewing port 406. For example, the viewing port 404 may be located 2-inches (2") from the sidewall of the base plate 402 and viewing port 406 may be located 2.5-inches (2.5") from the sidewall of the base plate 402. One or both of the viewing ports 404, 406 may be omitted according to one or more contemplated embodiments. For example, viewing port 406 can be omitted and viewing port 404 can be located 1.375-inches (1⅜") from the sidewall of the base plate 402.

The base plate 402 can be attached to a primary heating housing assembly 424, having an interior volume 426 defined by the walls of the primary heating housing assembly 424, the surface of the base plate 402, and a surface of insulating plate 428. For example, the interior volume 426 can have an internal diameter of 4-inches (4") and a length of 5-inches (5"). The primary heating housing assembly 424 can be made from, for example, aluminum with a 0.3125-inch (5/16") wall thickness. An O-ring 420 can be provided between the primary heating housing assembly 424 and the base plate 402. O-rings 420 can also be provided on each side of insulating plate 428 in the assembly with the primary heating housing assembly 424 and secondary heating housing assembly 432. The O-rings may have a 0.125-inch (⅛") thickness and a diameter of 4.25-inches (4¼").

Fuel to be heated flows through fuel conduit 422 in interior volume 436. For example, the fuel conduit 422 can take the shape of a helical tube so as to increase the amount of time the fuel spends in the primary heating housing assembly 424 and to increase and/or maximize the amount of heat transferred to the fuel in the conduit 422. The conduit 422 can be made of any suitable tubing material compatible with the fuel and capable of transferring heat to the fuel. For example, the conduit 422 can be made from copper tubing having an inner diameter of 0.375-inch (⅜").

Interior volume 426 may be filled with a heat transfer fluid, such as, but not limited to automotive anti-freeze, so as to conduct heat from a heating element 418 to the fuel conduit 422 and to the fuel flowing therethrough. The interior volume 426 may be filled to a level which allows for expansion of the heat transfer fluid during heating. For example, the interior volume 426 can be filled to about 80% capacity. A pressure/temperature relief valve and heat transfer fluid fill 416 can be provided in the primary heating housing assembly 424. Heat transfer fluid can be added to the primary heating housing assembly 424 as necessary through the fluid fill port 416. Heat transfer fluid fill level can be monitored using viewing ports 404, 406.

The heating element 418 can be any suitable heat source capable of providing the desired temperatures in the environment of the heat transfer fluid. For example, a 12-V, 42-Amp direct current (DC) glow plug which is regulated by a thermostat 410 can be provided in thermal communication with the interior volume 426. In another example, a 110-V, 600-Amp alternating current (AC) cal rod heater can be used. As necessary, a voltage converter can be provided to convert an available voltage, such as DC voltage from an automobile battery, to voltage usable by the heating element, such as AC voltage.

The secondary heating housing assembly 432 is separated from the primary heating housing assembly 424 by O-rings 420 and insulating plate 428. For example, insulating plate 428 can be a 0.5-inch (½") thick, 4.625-inches (4⅝") diameter plate made of an insulative material. The insulating plate 428 may be formed from any suitable insulative material capable of providing sufficient insulation while withstanding the pressures, temperatures, and chemicals associated with the fuel state control unit 400. For example, the insulating plate 428 can be made from a polymer, a ceramic, or a polymer composite material, such as a fiberglass-nylon composite.

Insulating plate 428 can have an outlet port 430 which connects to the outlet of the fuel conduit 422. Thus, heated fuel from the conduit 422 can flow into the interior volume 434 of the secondary heating housing assembly 432. The interior volume 434 is defined by the insulating plate 428, the walls of the secondary heating housing assembly 432, and a pressure plate 436. For example, the interior volume 434 can have an internal diameter of 4-inches (4") and a length of 5-inches (5"). The secondary heating housing assembly 432 can be made from, for example, aluminum with a 0.3125-inch (5/16") wall thickness.

The heated fuel expands into the interior volume 434 and continues to flow into an expansion housing assembly 440 through ports 438 in pressure plate 436. For example, pressure plate 436 can be a 0.5-inch (½") thick, 4.625-inches (4⅝") diameter plate made of aluminum. O-rings 420 can be provided on each side of pressure plate 436 in the assembly with the secondary heating housing assembly 432 and the expansion housing assembly 440. At least one port 438 can be provided in the pressure plate 436. In an embodiment, two ports 438 of equal diameter are provided in the pressure plate 436. The ports 438 can be arranged symmetrically about the center of the pressure plate 436. Each port can have a diameter of between 0.0625-inch (1/16") and 0.5 inch (½"). For example, each port has a diameter of 0.328-inch (21/64").

As the heated fuel flow through ports 438, the pressure of the heated fuel can be regulated and the fuel can continue to expand into the interior volume 442 of the expansion housing assembly 440 in a controlled manner. The interior volume 442 can be defined by the pressure plate 436, the walls of the expansion housing assembly 440, and a top plate 414. For example, the interior volume 442 can have an internal diameter of 4-inches (4") and a length of 8-inches (8"). The expansion housing assembly 440 can be made from, for example, aluminum with a 0.3125-inch (5/16") wall thickness. The top plate 414 can be connected to the expansion housing assembly 440 with an O-ring 420 therebetween. For example, the top plate can be a 0.5-inch (½") thick aluminum plate which is 4.625-inches (4⅝") in diameter. The expansion housing assembly 440 can include an outlet assembly for conveying the heated fuel from the interior volume 442 for use in an engine. For example, a pick-up tube 446 communicates with the interior volume 442, with an inlet of the pick-up tube 446 spaced from the pressure plate. Pick-up tube 446 can convey the heated fuel to outlet tubing 448 and on to fuel outlet 450. The pick-up tube 446 can be, for example, a 0.375-inch (⅜") copper tubing.

The fuel outlet 450 can connect to a fuel line (e.g., 228 in FIG. 2) which provides the heated fuel to, for example, a fuel rail (222 in FIG. 2). For example, the fuel line may have a maximum length of 18-inches (18") between the fuel outlet 450 of the fuel state control unit 400 and the inlet to the fuel rail. The fuel line may be configured such that a state of the fuel at the outlet 450 of the fuel state control unit 400 is substantially maintained as the fuel is conveyed to the fuel rail. For example, a portion or the entire length of the fuel line may be surrounded with appropriate insulation to reduce heat transfer between the interior volume of the fuel rail and the external environment. In addition, the length may be sufficiently short such as to preserve cavitation bubbles at the point of entry to the fuel rail or carburetor.

The aforementioned components of the fuel state control unit 400 can be assembled together by any suitable means, such as bolting, clamping, welding, etc. Moreover, the selected assembling techniques may require additional or fewer parts, as would be evident to one of ordinary skill. For example, where welding is used to assemble together components, O-rings 420 between the parts may be eliminated. Additionally, the disclosed sizes and materials for components of the fuel state control unit 400 are intended to be exemplary in nature; different materials and sizes for components of the fuel state control unit 400 are possible according to one or more contemplated embodiments.

When added to a fuel delivery system prior to the fuel rail or carburetor thereof, the fuel state control unit 400 can contribute to a reduction in engine exhaust emissions. Tests were performed on a 2000 GMC Sierra 6.0 L V8 engine at idle, 1500 RPM, and 2500 RPM. Diameters for ports 438 varied from 0.0625-inch (1/16") and 0.5-inch (1/2"). The number of ports was varied between a single port configuration and a dual port configuration. In general, increasing the number of ports may reduce CO, HC, and $NO_x$ exhaust emissions. Also, with greater port size, $CO_2$ emissions may increase, which may be representative of more efficient combustion. In general, CO, HC, and $NO_x$ emissions may decrease as port size increases. In a preferred embodiment, the number of ports in the pressure plate is two and the diameter of each port is 0.328-inch (21/64").

Further testing was conducted on the 2000 GMC Sierra 6.0 L V8 engine with the disclosed fuel state control unit installed. The fuel state control unit had a pressure plate with two ports therein, each port having a diameter of 0.328-inch (21/64"). Sampling of exhaust emissions with the fuel state control unit installed showed a significant reduction in CO, HC, and $NO_x$ emissions as compared to the engine emissions without the fuel state control unit installed. Table 1 illustrates exemplary pressure and temperature data from tests taken at various engine speeds for a dual port configuration with a diameter of 0.328-inches (21/64"). Tables 2-3 illustrate exemplary emissions data from tests taken at various engine speeds for a dual port configuration with a diameter of 0.328-inches (21/64").

TABLE 1

Fuel State in Fuel State Control Unit (FSCU) Installed in 2000 GMC Sierra at Various Engine Speeds

| | Pressure | | | | Temperature | | | |
|---|---|---|---|---|---|---|---|---|
| RPM | Primary Heating | Secondary Heating | Expansion | Fuel Rail | Primary Heating | Secondary Heating | Expansion | Fuel Rail |
| Idle | 78 | 75 | 80 | 82 | 111 | 114 | 105 | 127 |
| 1500 | 74 | 73 | 78 | 81 | 110 | 113 | 103 | 125 |
| 2500 | 75 | 72 | 75 | 78 | 109 | 110 | 99 | 122 |

TABLE 2

Carbon dioxide ($CO_2$) and carbon monoxide (CO) Emissions from 2000 GMC Sierra at Various Engine Speeds

| | $CO_2$ (percentage) | | | | CO (percentage) | | | |
|---|---|---|---|---|---|---|---|---|
| RPM | Without FSCU | With FSCU | Change | Percent Change | Without FSCU | With FSCU | Change | Percent Change |
| Idle | 13.28 | 14.88 | 1.6 | +12.1% | 0.4 | 0.06 | −0.34 | −85.0% |
| 1500 | 13.28 | 14.95 | 1.67 | +12.6% | 0.64 | 0.09 | −0.55 | −85.9% |
| 2500 | 12.74 | 15.03 | 2.29 | +18.0% | 0.58 | 0.11 | −0.47 | −81.0% |

TABLE 3

Hydrocarbon (HC) and nitrogen oxides ($NO_x$) Emissions from 2000 GMC Sierra at Various Engine Speeds

| | HC (ppm) | | | | $NO_x$ (ppm) | | | |
|---|---|---|---|---|---|---|---|---|
| RPM | Without FSCU | With FSCU | Change | Percent Change | Without FSCU | With FSCU | Change | Percent Change |
| Idle | 40 | 20 | −20 | −50.0% | 48 | 4 | −44 | −91.7% |
| 1500 | 39 | 17 | −22 | −56.4% | 65 | 33 | −32 | −49.2% |
| 2500 | 39 | 20 | −19 | −48.7% | 213 | 50 | −163 | −76.5% |

In road testing performed on the 2000 GMC Sierra 6.0 L V8 engine, the fuel state control unit was used to heat the fuel to a temperature of about 180° F. The results of the road testing demonstrated a significant increase in the gas mileage of the 2000 GMC Sierra from approximately 12 miles per gallon (mpg) without the fuel state control unit installed to about 30 mpg with the fuel state control unit installed. Exhaust emissions with the fuel state control unit operating to heat the fuel to 180° F. were similar to those shown in Tables 2-3 above.

Accordingly, by employing a fuel state control unit 400, hydrocarbon emissions may be reduced by as much as 88%. Carbon monoxide emissions may be reduced by as much as 90%. Carbon dioxide emissions may be reduced by as much as 5%. Generally, a slight decrease or an increase in carbon dioxide emissions may be noticed along with a corresponding decrease in carbon monoxide emission, which may be representative of improved combustion efficiency. Nitrogen oxides emissions may be reduced by as much as 80%. Gas mileage may be significantly increased by as much as 270%

Figure 5:
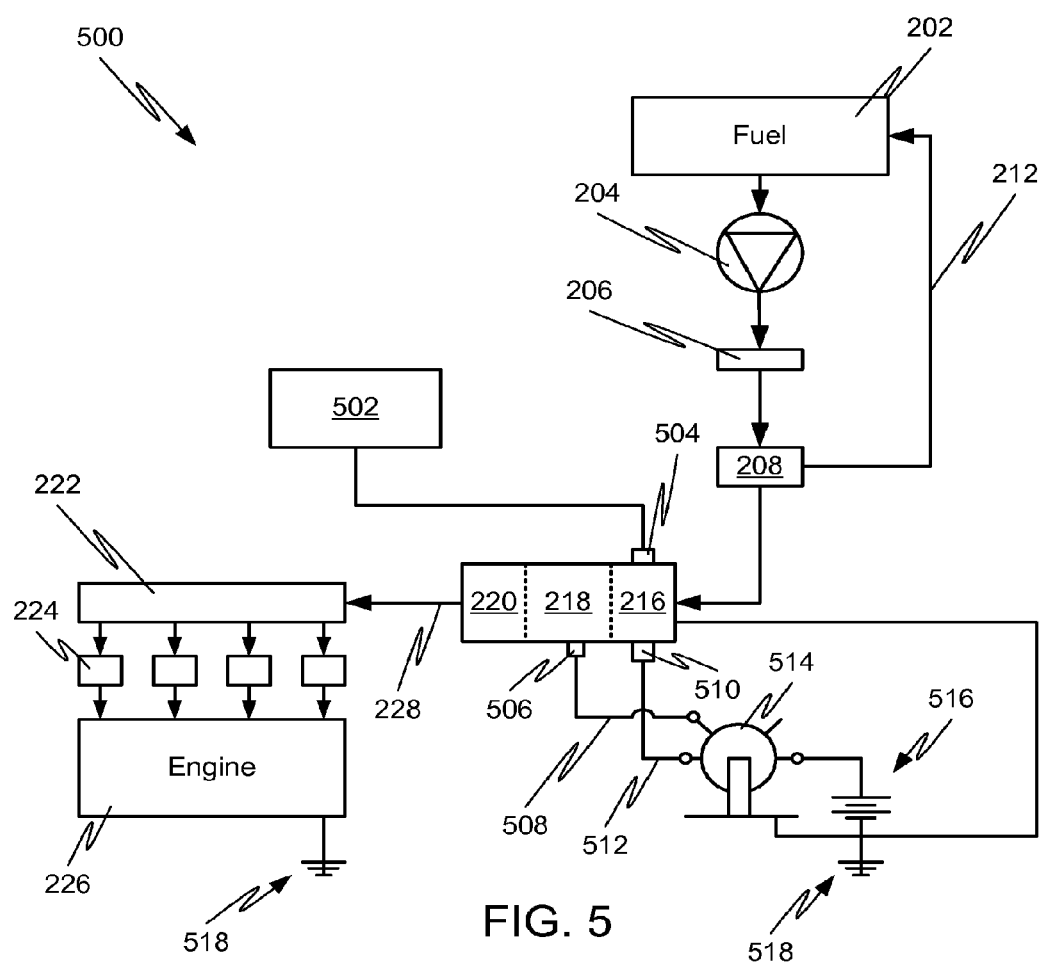
FIG. 5 is a schematic showing an alternative arrangement of components of an engine-based system with a fuel state control unit, according to embodiments of the present disclosure.

Referring now to FIG. 5, an engine system 500 is a variation of the configuration of FIG. 2. Fuel state control unit 214 can include a pressure relief valve 504 connected to primary heating chamber 216. The pressure relief valve 504 can be connected to reservoir 502. Heat transfer fluid in primary heating chamber 216 that overflows can thus be recovered into reservoir 502 for later refill of the primary heating chamber 216 or use by the engine system 500 for another purpose. For example, when the heat transfer fluid is engine coolant, reservoir 502 can be the anti-freeze recovery bottle of engine system, whereby overflow coolant from the fuel state control unit can be reclaimed for use in cooling the engine.

Operatively connected to the primary heating chamber 216 is a heat source 510, such as a glow plug or cal rod. Thermostat 506 can be provided in thermal communication with the secondary heating chamber 218. The thermostat 506 can control operation of heat source 510. For example, thermostat 506 can open/close voltage relay 514 through connection 508, which turns heat source 510 on or off via connection 512. A voltage source 516 can be provided to power voltage relay 514 and heat source 510. Voltage source 516 may also include a voltage converter, as necessary, to convert voltage to a type useable by the heat source 510. The frame of the fuel state control unit 214 can be connected to a ground plane 518, such as engine ground.

Figure 6:
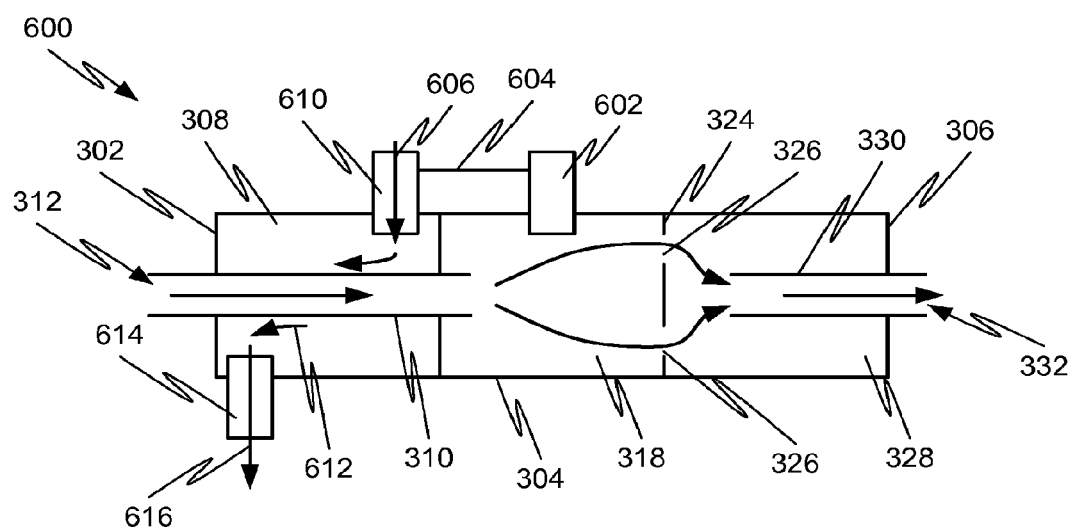
FIG. 6 is a simplified schematic of an alternative fuel state control unit, according to embodiments of the present disclosure.

Referring to FIG. 6, fuel state control unit 600 is a variation of the configuration of FIG. 3. In contrast to FIG. 3, primary heating chamber 302 uses a controlled flow of heat transfer fluid in the interior volume 308 to effect heating of the fuel flowing through conduit 310. For example, a vacuum controlled valve 606 can be provided in fluidic communication with the interior volume 308 of the primary heating chamber. A heat transfer fluid, such as coolant from the engine block, is coupled to an inlet port 610 of the valve 606.

A normally-closed vacuum controlled thermostat 602 can be disposed in thermal communication with the secondary heating chamber 304. When the temperature of the fuel in the secondary heating chamber 304 rises to a predetermined value, the thermostat 602 can control valve 606 via connection 604 to close and stop heated engine coolant from flowing into the interior volume 308. For example, the thermostat can open to allow vacuum from the engine system to pass through to the vacuum controlled valve 606, which is normally open. The vacuum shuts off the flow 612 of fluid therethrough, thereby arresting the heating of the fuel in conduit 310. When the fuel temperature drops below a predetermined value, thermostat 602 closes the vacuum switch, which in turn allows the valve 606 to open, thereby allowing the engine coolant to pass therethrough. The flow 612 of engine coolant heats the fuel flowing in conduit 310 and exits interior volume 308 through outlet 614. The exiting coolant can be returned to the engine coolant loop via line 616.

Alternatively, oil used by the engine system can be used to heat the fuel in conduit 310 by flowing through the interior volume of the primary heating chamber 302. The operation is similar to that of FIG. 6, but oil from an oil port in the engine block is used to supply heat to the primary heating chamber 302 of the fuel state control unit 600. After passing through the interior volume 308, the oil is returned to the oil crankcase of the engine. The oil pump of the engine can supply enough pressure to push the oil through the primary heating chamber 302 a minimal pressure drop in the engine oil pressure.

Figure 7:
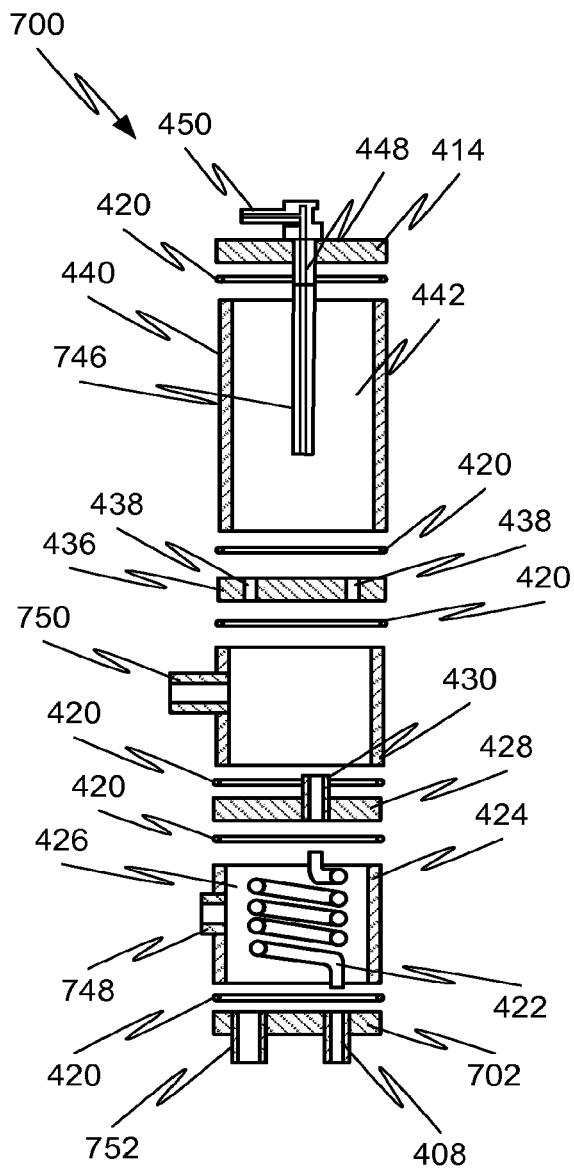
FIG. 7 is a cross-sectional view of an alternative fuel state control unit, according to embodiments of the present disclosure.

Referring to FIG. 7, fuel state control unit 700 is a variation of the configuration of FIGS. 4A-4C. In contrast to FIGS. 4A-4C, primary heating chamber 424 uses a controlled flow of heat transfer fluid in the interior volume 426 to heat the fuel flowing through conduit 422. For example, a vacuum controlled valve can be attached to valve port 748, which is in fluidic communication with the interior volume 426 of the primary heating housing assembly 424. A heat transfer fluid, such as engine coolant from the engine block can enter the interior volume 426 through the valve port 748 and exit through outlet 752 in base plate 702. A thermostat can be mounted to thermostat port 705, which is in fluidic communication with the interior volume 434 of secondary heating housing assembly 432. The thermostat can sense the temperature of the fluid in the interior volume 434 and control flow of heat transfer fluid through interior volume 426 to adjust the temperature of the heated fuel. The heated fuel can then flow through ports 438 in pressure plate 436 before exiting the expansion chamber 440 via pick-up tube 746.

Although the fuel state control unit has been described in specific embodiments as applied to a gasoline engine, the fuel state control unit can also be applied to engines using diesel, synthetic, bio-fuels, liquefied coal, ethanol, or other fuels according to one or more contemplated embodiments. Moreover, the fuel state control unit can be used with a variety of engines besides those applied in automobiles. For example, the fuel state control unit can be applied to small air-cooled engines, such as those found in generators or lawn mowers, as well as other combustion engines, such as the burner assembly of a furnace or other heat generating device.

Although shown as separate components in the figures for purposes of clarity, embodiments are contemplated wherein various components can be combined together. For example, the fuel state control unit can be combined with the fuel delivery unit or a portion thereof. In another example, the fuel delivery unit or a portion thereof can be combined with the engine. In still another example, the fuel state control unit, the fuel delivery unit, and the engine can be combined together.

Note that in any of the foregoing embodiments, a supplemental fuel pump may be provided so as to subject the fuel to a high pressure drop without sacrificing the pressure required to feed the injector manifold (rail). Note also that a proportional, integral, differential (PID) controller or predictive control algorithm employing inputs from the vehicle network including throttle inputs, engine speed, combustion air flow, torque sensors, etc., to render a predicted fuel supply rate can be calculated. Such a control may be used in conjunction with a fast-acting (e.g., electric) heater so that the fuel temperature can be regulated within predefined limits.

In any of the foregoing embodiments, the orifices may be sized such that under fuel flow conditions of 1 gallon per hour or higher, one or more orifices may be provided in the fuel flow path such that the flow across the one or more orifices is characterized by a cavitation number, σ, of approaching unity and preferably, substantially less than 1000, and even more preferably, substantially less than 100, and even more preferably, substantially less than 10. The cavitation number may be given by:

$$\sigma = \frac{(P_r - P_v)}{\left(\frac{1}{2}\rho v^2\right)}, \qquad (1)$$

where $P_r$ is an approximate pressure at a characteristic point for calculating the cavitation producing conditions, such as a point of maximum velocity, $P_v$ is the approximate vapor pressure of the fuel (e.g., gasoline at a temperature between 90° F. and 180° F.), ρ is the density of the fuel, and v is an approximate characteristic velocity across the orifice, which may be taken to be a peak local velocity near the one or more orifices. In an example, the ports in the pressure plate may be sized and/or shaped such that the cavitation number, σ, is not substantially greater than unity. Moreover, the ports may be formed so as to have sharp edges (i.e., no radius of curvature) at an inlet side thereof, which made in the formation of cavitation in the fuel.

It is further noted that variations in the dimensions of the fuel state control unit and associated engine system components are possible according to one or more contemplated embodiments. For example, a smaller fuel state control unit (e.g., 2" inner diameter and 12" overall length) can be constructed for smaller engines while larger engines may require a larger fuel state control unit to accommodate the necessary fuel volume. In another example, a length of a fuel line between the fuel rail and the fuel state control unit may depend on the layout of a particular engine compartment. Accordingly, embodiments of the fuel state control unit and associated engine system components are not to be limited to the disclosed dimensions.

Moreover, one or more of the elements of the fuel state control unit may be designed with the intention of being serviceable and/or replaceable. For example, the fuel state control unit may be constructed to allow access to the interior volumes for cleaning of the interior volumes, replacement of the insulating plate, and/or replacement of the pressure plate. The fuel state control unit may also be constructed in a modular fashion to allow replacement of different sections as a whole. For example, the fuel state control unit can be constructed to allow simultaneous removal of the insulating plate, the secondary heating chamber, and the pressure plate as whole unit for replacement with a new unit.

Any of the above embodiments may be modified to replace the multiple chamber arrangement with alternative mechanisms for temperature regulation of the fuel, for example, tube having an electrical heater built into the walls thereof, a flow chamber with an immersion heater, a tube with external fins that are heated by air after convecting across a radiator, etc. In addition, of the above embodiments may be modified to replace the multiple chamber arrangement with alternative mechanisms for producing a pressure drop or fuel acceleration sufficient to produce cavitation. For example, a venturi, a screen, protrusions in a flow channel, or any other mechanism for producing a local velocity such that cavitation results can be used.

Features of the disclosed embodiments can be combined, rearranged, omitted, etc., within the scope of the invention to produce additional embodiments. Furthermore, certain features may sometimes be used to advantage without a corresponding use of other features.

It is, thus, apparent that there is provided, in accordance with the present disclosure, devices, systems, and methods for controlling fuel states for internal combustion engines. Many alternatives, modifications, and variations are enabled by the present disclosure. While specific embodiments have been shown and described in detail to illustrate the application of the principles of the invention, it will be understood that the invention may be embodied otherwise without departing from such principles. Accordingly, Applicants intend to embrace all such alternatives, modifications, equivalents, and variations that are within the spirit and scope of the present invention.

The invention claimed is:

1. A fuel state control unit for an internal combustion engine, the fuel state control unit comprising:
    a multi-chamber module having at least a first chamber, a second chamber, and a third chamber serially arranged, the module having a fuel inlet and a fuel outlet,
    the fuel inlet being configured to connect to a fuel supply, the fuel outlet being configured to connect to a fuel delivery unit for the internal combustion engine,
    the fuel inlet being in fluid communication with a conduit extending through the first chamber, the second chamber being in fluid communication with an outlet of said conduit such that fuel exiting the conduit at said outlet flows into an interior volume of the second chamber, the third chamber being in fluid communication with the second chamber through at least one port extending between the second chamber and the third chamber such that fuel from the second chamber interior volume flows into an interior volume of the third chamber via said at least one port; and
    a heating module configured to heat fuel flowing through said conduit in said first chamber to a temperature between 90° F. and 180° F.,
    wherein the second chamber is defined by two radially aligned walls which separate it from the first and third chambers, the second chamber being disposed between the first and third chambers in an axial direction of the multi-chamber module.

2. The fuel state control unit according to claim 1, wherein the at least one port has a diameter that provides, at a fuel flow rate of at least 1 gallon per hour, a cavitation number below 10, each port having a diameter not greater than 0.5-inch.

3. The fuel state control unit according to claim 1, wherein the heating module includes a cal rod in the first chamber and a thermostat in thermal communication with the first chamber, the cal rod being disposed so as to be able to heat a heat transfer fluid in the first chamber, the thermostat being configured to measure a temperature of the heat transfer fluid and control operation of the cal rod responsively to the measured temperature.

4. The fuel state control unit according to claim 1, the multi-chamber module further including a heat transfer fluid inlet and a heat transfer fluid outlet, the heat transfer fluid inlet and outlet being configured to connect to respective lines of a heat transfer fluid supply, wherein the heating module includes a valve and a thermostat, the valve being coupled to one of the heat transfer fluid inlet and the heat transfer fluid outlet and controlling flow of fluid therethrough, the thermostat being in thermal communication with the second chamber and controlling an open state of the valve responsively to temperature of fuel in the second chamber.

5. The fuel state control unit according to claim 4, wherein the heat transfer fluid is engine coolant which has been heated by the internal combustion engine.

6. The fuel state control unit according to claim 4, wherein the heat transfer fluid is engine oil which has been heated by the internal combustion engine.

7. The fuel state control unit according to claim 1, wherein the fuel outlet is configured to connect to a fuel rail of a fuel injection system of the internal combustion engine.

8. The fuel state control unit according to claim 1, wherein the fuel outlet is configured to connect to a carburetor of the internal combustion engine.

9. The fuel state control unit according to claim 1, wherein the conduit is a helical conduit.

10. The fuel state control unit according to claim 1, wherein an insulating plate separates an interior volume of the first chamber from the second chamber interior volume, the insulating plate being formed of a ceramic, polymer, or polymer composite material.

11. The fuel state control unit according to claim 1, wherein a pressure plate separates the third chamber interior volume from the second chamber interior volume, said at least one port being formed in the pressure plate.

12. The fuel state control unit according to claim 11, wherein said at least one port is two ports in the pressure plate.

13. The fuel state control unit according to claim 12, wherein the two ports are symmetrically arranged in the pressure plate.

14. The fuel state control unit according to claim 11, wherein the first through third chambers and the pressure plate are formed of a first metal, and the conduit in the first chamber is formed of a second metal different from said first metal.

15. The fuel state control unit according to claim 1, further comprising a pickup tube with an inlet thereof disposed in the interior volume of the third chamber, the pickup tube being configured to convey fuel from the third chamber interior volume to the fuel delivery unit.

16. A fuel state control unit comprising:
a multi-chamber module having at least a first chamber, a second chamber, and a third chamber serially arranged, the module having a fuel inlet and a fuel outlet,
the fuel inlet being configured to connect to a fuel supply, the fuel outlet being configured to connect to a fuel delivery unit,
the fuel inlet being in fluid communication with a conduit extending through the first chamber, the second chamber being in fluid communication with an outlet of said conduit such that fuel exiting the conduit at said outlet flows into an interior volume of the second chamber, the third chamber being in fluid communication with the second chamber through at least one port extending between the second chamber and the third chamber such that fuel from the second chamber interior volume flows into an interior volume of the third chamber via said at least one port; and
a heating module configured to heat fuel flowing through said conduit in said first chamber to a temperature between 90° F. and 180° F.,
wherein the outlet of the conduit has a diameter less than a diameter of the second chamber,
the at least one port has a diameter less than the diameter of the second chamber,
the outlet of the conduit is arranged at a first end of the second chamber adjacent to the first chamber in an axial direction of the multi-chamber module, and
the at least one port is arranged at a second end of the second chamber adjacent to the third chamber in said axial direction.

17. The fuel state control unit according to claim 16, wherein the second chamber is defined by two radially aligned walls which separate it from the first and third chambers, the second chamber being disposed between the first and third chambers in said axial direction of the multi-chamber module.

* * * * *